United States Patent [19]

Caselli et al.

[11] Patent Number: 5,158,992
[45] Date of Patent: Oct. 27, 1992

[54] PROCESS FOR THE STABILIZATION OF POLYOLEFIN AND PRODUCTS OBTAINED THEREBY

[75] Inventors: Giancarlo Caselli; Giuseppe Gorini, both of Ferrara, Italy

[73] Assignee: HIMONT Incorporated, Wilmington, Del.

[21] Appl. No.: 559,752

[22] Filed: Jul. 30, 1990

[30] Foreign Application Priority Data

Aug. 2, 1989 [IT] Italy .......................... 21423

[51] Int. Cl.$^5$ .................. C08K 9/00; C08K 5/11; C08K 5/3435; C08K 5/51
[52] U.S. Cl. .................. 523/207; 524/62; 524/102; 524/109; 524/120; 524/126; 524/128; 524/133; 524/135; 524/147; 524/151; 524/153; 524/291; 524/359; 524/392
[58] Field of Search .......... 523/210, 207, 202; 524/102, 126, 291, 487, 62, 109, 120, 128, 133, 135, 147, 151, 153, 359, 392

[56] References Cited

U.S. PATENT DOCUMENTS

| | | | |
|---|---|---|---|
| 4,187,212 | 2/1980 | Zinke et al. | 524/140 |
| 4,377,651 | 3/1983 | Leininger | 524/101 |
| 4,463,112 | 7/1984 | Listner et al. | 524/109 |
| 4,739,000 | 4/1988 | Burton | 524/128 |
| 4,853,426 | 8/1989 | Chatterjee | 523/210 |
| 5,017,633 | 5/1991 | Tscheulin | 524/126 |
| 5,045,577 | 9/1991 | Mulhaupt et al. | 524/126 |

FOREIGN PATENT DOCUMENTS

| | | |
|---|---|---|
| 2260213 | 6/1973 | Fed. Rep. of Germany . |
| 2301558 | 9/1976 | France . |
| 2389652 | 12/1978 | France . |
| 63-241048 | 10/1988 | Japan . |
| 2227490 | 8/1990 | United Kingdom ........... 524/126 |

Primary Examiner—Kriellion S. Morgan

[57] ABSTRACT

Disclosed are olefin polymers in nonextruded, aspolymerized particle form having a regular, essentially symmetrical geometrical shape, which are stabilized by depositing on their surface a mixture which is either melted, or in which at least stabilizer (A) is in the liquid state, and which comprises the following stabilizers (percent by weight on the polymer):

A) from 0.02% to 0.015% of one or more organic phosphites or phosphonites or mixtures thereof, which are liquid at room temperature or have melting point below 100° C.;

B) from 0.025% to 0.2% of one or more phenolic antioxidants with melting point from 45° to 130° C.; and, optionally, one or more of the following additional components:

C) from 0.05% to 0.5% of one or more thioethers, or organic polysulfides or mixtures thereof;

D) from 0.1% to 1.0% of one or more light stabilizers which are liquid at room temperature or have a melting point below 150° C., selected from the group consisting of HALS, benzophenone and benzotriazole derivatives; and E) one or more diluents selected from the group consisting of paraffins and cycloparaffins, which are liquid at room temperature, or have a melting point below 110° C., expoxidized soy bean or linseed oil, silicone oils, and olefin oligomers in an amount not greater than 0.3%.

13 Claims, No Drawings

PROCESS FOR THE STABILIZATION OF POLYOLEFIN AND PRODUCTS OBTAINED THEREBY

The present invention concerns a process for the stabilization of olefin polymers in nonextruded particle form with a regular, essentially symmetrical, usually spheroidal geometrical shape, comprising depositing on the surface of said particles a mixture comprising one or more organic phosphites and/or phosphonites, and one or more phenolic antioxidants. Said mixture may also include additional components, particularly light stabilizers, thioethers, organic polysulfides, and diluents. This invention also relates to the products produced by this process.

A method very well known in the field for the stabilization of olefin polymers consists of blending the polymers with the stabilizers in a suitable mixer, including an extruder and extruding the mixture thus obtained. In this manner one obtains pellets in which the stabilizers are distributed in a relatively homogeneous manner, giving good stabilization to the pellets themselves, which can then be transformed into finished products.

The above mentioned techniques of pelletization by extrusion are very suitable for polymers obtained in irregular particle form and with very low flowability, which therefore require pelletization in order to be transformed into a commercial product. However, at the present time, in the olefin polymerization field some catalysts and processes are becoming important which can produce regular shape polymer particles, in particular in spheroidal form, and having a controlled particle size distribution.

Said polymer particles, because of their high flowability, high bulk density values, and absence of fines, can be commercialized as produced without the necessity of transformation into extruded pellets. There is, therefore, a clear need for a process which will permit stabilization of the above mentioned particles as produced, without having to go through further extrusion and processing stages.

For this purpose some processes are employed whereby the polymer particles are treated with solutions or suspensions of stabilizers.

These processes, however, require additional steps to remove the solvent or the suspending medium, and have very little flexibility since they require a selection of solvents and/or treatment conditions which differ depending on the stabilizers used. Further, they frequently do not provide a coating or surface treatment which survives storage intact and is effective after long periods of exposure to air, light and other elements.

This invention provides a process for the stabilization of olefin polymers in nonextruded, as polymerized particles having a regular, essentially symmetrical, usually spheroidal geometrical shape, said particles being formed in said regular shape during the polymerization reaction, comprising the depositing on the surface of said particles a melted mixture, or a mixture in which at least stabilizer (A) is in the liquid state, said mixture comprising the following stabilizers (percent by weight on the polymer):

A) from 0.02% to 0.15%, preferably from 0.03% to 0.01%, of one or more organic phosphites or phosphonites or mixtures thereof, which are liquid at room temperature of have a melting point below 100° C.;

B) from 0.025% to 0.2%, preferably from 0.03% to 0.2%, most preferably from 0.04% to 0.1%, of one or more phenolic antioxidants with melting point from 45° C. to 130° C.; and, optionally, one or more of the following additional components:

C) from 0.05 to 0.5%, preferably from 0.1% to 0.4%, of one or more thioethers or organic polysulfides or mixtures thereof;

D) from 0.1% to 1.0%, preferably from 0.15% to 0.8%, of one or more light stabilizers which are liquid at room temperature or have a melting point below 150° C., selected from the group consisting of hindered amine light stabilizers (HALS) and benzophenone and benzotriazole derivatives;

E) one or more diluents selected from the group consisting of paraffins and cycloparaffins which are liquid at room temperature, or have a melting point below 110° C., expoidized soy bean or linseed oil, silicone oils, and olefin oligomers in an amount not greater than 0.3%, preferably from 0.05% to 0.15%.

This process provides polyolefin particles which are stabilized against color changes and in general against oxidation and degradation phenomena caused by exposure to heat and light especially in the presence of oxygen.

Moreover, with the present process the stabilizers can be deposited on the polymer particles as an almost continuous coating or at least a surface impregnation (depending on the composition of the liquid mixture and the porosity of the polymer particles being treated). The thus treated polymer particles have good resistance to storage for extended periods of time and to long periods of exposure to air and light.

The stabilizer mixture which is used according to the present invention is preferably selected in such a way that it remains in the liquid state at least at the temperature of the polymer particles as they come from the polymerization reactors (which usually is not lower than 50°-60° C. is and not higher than about 120° C.), after the polymer separation and catalyst deactivation phases, so that it can, therefore, be added at this point in order to deposit an homogeneous coating on the surface of the particles themselves.

The percent by weight on the polymer expresses the concentration of each component (A), (B), (C), (D) and (E) with respect to the weight of the polymer particles on which they are deposited.

Given the small quantities of stabilizers which are deposited on the polymer particles according to the process of the present invention, it is possible to determine the respective proportions of the components in the mixture to be fed into the stabilization equipment (which will be described later on) directly on the basis of the above mentioned concentrations, without having to make corrections which would take into consideration the weight increase of the polymer after stabilization.

Therefore, one can use mixtures which include the single components in the following proportions (parts by weight):

from 2 to 15 of (A);
from 2.5 to 20 of (B);
and optionally,
from 5 to 50 of (C);
from 10 to 100 of (D);
up to 30 of (E);

In order to compensate for any loss of stabilizers in the system, it is preferred to feed an excess of mixture, up to about 10%, with respect to the theoretical quantity, which is calculated on the basis of the weight of the polymer to be stabilized.

For instance, if one wants to stabilize 100 kg of polymer by depositing on the particles, by weight, 0.05% of (A) and 0.1% of (B), then 150 g of a liquid mixture containing 5 parts by weight of (A) and 10 parts of (B) will have to be fed, optionally adding a small excess of this mixture to compensate for system loss.

The organic phosphites which can be used as stabilizers according to the present invention are those compounds which are liquid at room temperature, or have a melting point below 100° C., including, preferably, those having the following general formulas:

I where $R_1$, $R_2$ and $R_3$ are the same or different and are $C_{1-18}$ alkyl, $C_{6-18}$ aryl, or $C_{7-18}$ aralkyl radicals;

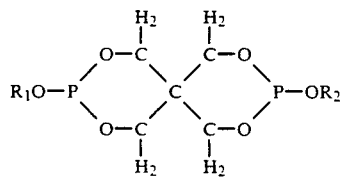
II where $R_1$ and $R_2$ are the same or different and have the meaning indicated above;

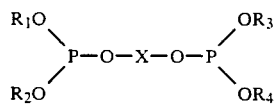
III where $R_1$, $R_2$, $R_3$ and $R_4$ are the same or different and have the same meaning as R, $R_2$ and $R_3$ above, X is a bivalent $C_{1-10}$ alkyl, $C_{6-18}$ aryl or $C_{7-20}$ aralkyl radical.

Specific examples of compounds, which are liquid or have a melting point below 100° C., included in the general formulas I, I, and III, are: distearylpentaerythrityl diphosphite; 4,4'-butylidenebis(3-methyl-6-tert-butylphenyl-di-tridecyl)phosphite; tris(mononyl phenyl) phosphite, all of which are commercially available.

The organic phosphonites which are liquid at room temperature or have a melting point below 100° C., include, preferably, those having the following general formula:

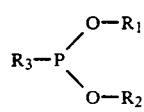
IV where $R_1$, $R_2$, and $R_3$ are the same or different and are $C_{1-18}$ alkyl, $C_{6-18}$ aryl, or $C_{7-18}$ aralkyl radicals.

Alternatively, and this is a further preferred case, the $R_3$ radical can be the group

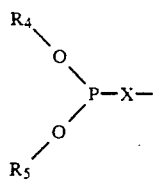
V where $R_4$ and $R_5$ are the same or different and have the same meaning as set forth above for $R_1$ and $R_2$, and X is a bivalent $C_{1-10}$ alkyl, $C_{6-18}$ aryl, or $C_{7-20}$ aralkyl radical.

Specific examples of phosphonites which are liquid at room temperature or have a melting point below 100° C., included in the general formulas IV and V, are the compounds having the following formulas:

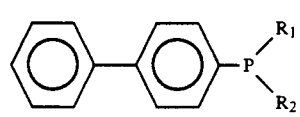
VI where $R_1$ and $R_2$ are both $-O-C_4H_9$, $-O-C_8H_{17}(iso)$ or

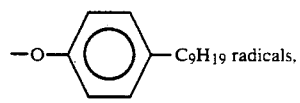

or either $R_1$ or $R_2$ group is a

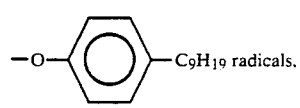

while the other is a $-O-C_4H_9$ or $-O-C_8H_{17}(iso)$ radical;

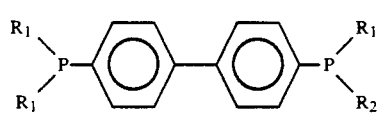
VII where $R_1$ and $R_2$ are both $-O-C_4H_9$, $-O-C_8H_{17}(iso)$,

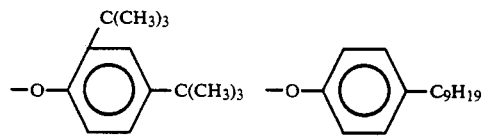

radicals or $R_1$ is a

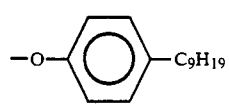

radical and $R_{23}$ is a $-O-C_8H_{17}$, $-O-C_8H_{17}(iso)$, or $-O-C_4H_9$ radical, or $R_1$ is a

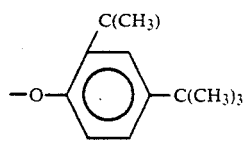

radical and $R_2$ is a —O—$C_4H_9$ radical;

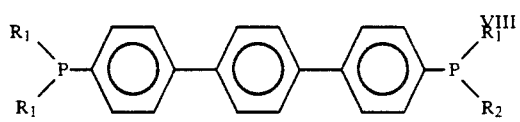

where $R_1$ and $R_2$ are both —O—$C_8H_{17}$ or

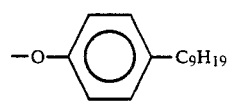

radicals, or $R_1$ is a

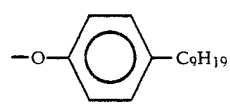

radical and $R_2$ is a

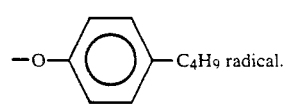

Most preferred is the compound of the formula VII where $R_1$ and $R_2$ are both

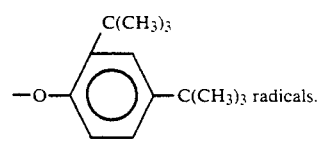

Said compound, the chemical name of which is tetrakis(2,4-di-tert-butylphenyl)-4,4'-biphenylene diphosphonite, is the main component of a stabilizing composition sold by Sandoz under the Sandostab P-EPQ trademark.

As stated above, the stabilizing mixtures of the present invention also comprise one or more phenolic antioxidants, i.e. sterically hindered phenols having a 45° to 130° C. melting point.

Examples of preferred phenolic antioxidants are: 2,6-di-tert-butyl-4-methylphenol; 2,2-bis(4-(2-(3,5-di-tert-butyl-4-hydroxyhydrocinnamoyloxy))ethoxyphenyl)-propane; octadecyl-3 (3,5-di-tert-butyl-4-hydroxyphenyl) propionate; and pentaerythritol tetrakis(3-(3,5-di-tert-butyl-4-hydroxyphenyl)propionate), all of which are commercially available.

Examples of thioethers which can be used as additional component (C) are dilauryl thiodipropionate and distearyl thiodipropionate.

Preferred examples of organic polysulphides are the compounds with the following general formula:

$$R—S—S—R \quad \text{IX}$$

where the R radicals are the same or different and are $C_{1-20}$ alkyl, $C_{6-20}$ aryl, or $C_{7-20}$ aralkyl radicals.

Particularly preferred is the compound of formula IX where R is a —$C_{18}H_{37}$ radical.

The HALS which can be used as additional components (D) are compounds which are liquid at room temperature or have a melting point below 130° C., and include, in the molecule, one or more substituted piperidyl groups with the following general formula:

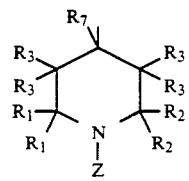

where the $R_1$ radicals are the same or different and are $C_1-C_4$ alkyl radicals, tetramethylpiperidyl radicals, or the alkyl radicals together with the piperidyl carbon atoms to which they are bonded form a $C_5-C_9$ cycloalkyl radical; the $R_2$ radicals are the same or different and are hydrogen or $C_1-C_{18}$ alkyl radicals, $C_7-C_{18}$ aralkyl radicals, or the alkyl radicals together with the piperidyl carbon atoms to which they are linked form a $C_5-C_{10}$ cycloalkyl radical; the $R_3$ radicals are the same or different and are hydrogen, or $C-C_{18}$ alkyl radicals or $C_7-C_{18}$ aralkyl radicals; the $R_4$ radical is hydrogen, a $C_1-C_8$ alkyl radical or a benzyl radical; Z is hydrogen, or a $C_1-C_{18}$ alkyl radical, or a $C_1-C_{12}$ alkylene, $C_3-C_{12}$ alkenyl, $C_3-C_5$ alkynyl, $C_7C_{18}$ aralkyl, $C_2-C_{14}$ acyl, $C_2-C_{18}$ alkanoyl, $C_3-C_{18}$ alkoxyalkyl, $C_3-C_{18}$ alkenoyl, oxyl, cyanomethyl, xylylene radical, or a radical with a valence from 1 to 4 and containing from 1 to 4 hydroxyl groups and, optionally, ether, ester or N, S or O containing heterocyclic group, wherein the radical has the valences linked to the nitrogen of the piperidyl groups, or a bivalent radical containing one or more ester or amide groups, or a

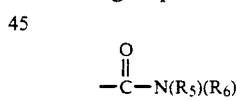

radical where $R_5$ and $R_6$ are hydrocarbon radicals.

Preferably Z is a $C_1-C_{12}$ alkyl radical, or a $C_3-C_8$ alkenyl, $C_7-C_{11}$ aralkyl radical, or a bivalent radical containing one or more ester groups, said bivalent radical having valence linked to the nitrogen of the piperidyl groups.

Preferred examples of HALS which are liquid or have a melting point below 130° C. are the compounds having the following formulas:

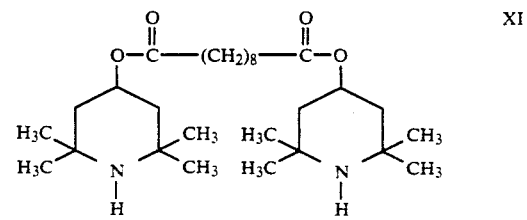

-continued

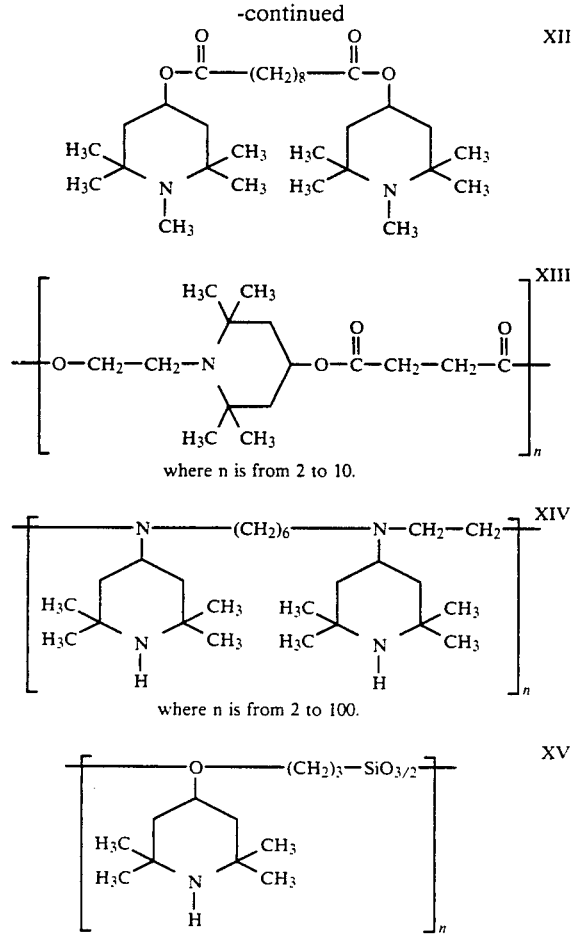

where n is from 2 to 10.

where n is from 2 to 100.

where n is from 2 to 100. HALS compounds having the above formulas are commercially available.

Preferred examples of benzophenone or benzotriazole derivatives are: 2-hydroxy-4-octyloxybenzophenone; and 2-(2'hydroxy-3-tert-butyl-5'-methylphenyl)-5-chlorobenzotriazole, both of which are commercially available.

Examples of diluents (E), besides the epoxidized soy bean or linseed oils, are the microcrystalline paraffin waxes having a melting point from 60° to 90° C., and preferably a penetration point between 20 to 90, most preferably between 30 and 80, at 25° C. (5 seconds/100 g, DIN 51579, ASTM D 1321). Products of this type are commercially available.

Examples of silicone oils and olefin oligomers are the BAYSILONE M 100 silicone oil, H-300 polybutene, NAPVIS D 03, D 07 and D10.

Among the liquid mixtures having the compositions described above, particularly preferred are those comprising:
A) tetrakis(2,4-di-tert-butylphenyl)4,4'-biphenylene diphosphonite;
B) pentaerthritol-tetrakis(3,5-di-tert-butyl-4-hydroxyphenyl)propionate and optionally octadecyl-3-(3,5-di-tert-butyl-4-hydroxyphenyl)propionate, and optionally,
D) the HALS of formula XII;
E) one or more of the diluents described above, in the proportions required by the present invention.
The above mentioned mixtures are liquid even at room temperature.

As previously mentioned, the present liquid stabilizer mixtures are preferably deposited on the surface of the polymer particles after discharge from the polymerization reactor, separation of the polymer, deactivation of the catalyst an purification phases.

Said phases include the removal, e.g. through "flash-drying", of the excess liquid monomer or solvent that may be present in the polymerization reactor discharge (separation), and the deactivation (killing) of the catalyst. Volatile substances, such as solvents, unreacted monomers and oligomers, if any, can be removed during the deactivation phase.

The latter can be done by treating the polymer particles with inert gases, (nitrogen, for example) at high temperatures (up to a few degrees below the polymer melting point), and/or steam. Preferably, pure steam or steam diluted with nitrogen is used.

Whenever steam is used, there can be an additional drying stage, with nitrogen or other inert gases, for example, in order to eliminate the residual moisture from the polymer particles.

Upon exiting the separation and deactivation systems, the polymer particles usually have a temperature not lower than 50° C., more typically not lower than 60° C. It is preferred to deposit the liquid stabilizer mixture described previously on said particles while the particles still hot, using known methods of surface additivation, for example, by using continuous or discontinuous mixers (particularly horizontal mixers) optionally equipped with a spraying mechanism.

It is desirable that the residence time of the polymer particles in the mixer be at least 5 minutes, in order to obtain a good distribution of the stabilizing mixture on the surface of the particles.

The molten or liquid stabilizer mixture can be prepared and preserved in a vessel provided with a heating jacket and a mechanical agitator, introducing the components of the mixture in increasing melting point order.

Usually the operation occurs in a nitrogen atmosphere at temperatures between 90° C. and 140° C., and the molten or liquid mixture is sent to the additivation plant section through pumps and feeders.

Downstream from the stabilization described above, or within the same plant section used for it, before or after the addition of the molten or liquid stabilizer mixture, other stabilizers and additives can be used, such as HALS with a melting point higher than 150° C., metal stearates (Ca and Na stearates for example), synthetic hydrotalcite, glyceryl monostearate, slip agents (such as erucamide, oleamide), antiblocking agents (like $SiO_2$ or synthetic zeolites), nucleating agents, antistatic agents, etc.

If the addition of the above mentioned stabilizers and additives is done after the molten or liquid mixture has been deposited according to the present invention, it is desirable to select the composition of the liquid or molten stabilizer mixture and the operating conditions in such a way that the mixture of stabilizers on the particles is maintained fluid at least during the introduction of the additional additives and solid stabilizers, thus allowing them to adhere to the polymer particles.

The polyolefins which can be conveniently stabilized through the process of the present invention include polymers and copolymers, or their mixtures obtained through sequential polymerization, of olefins of formula $RC=CH_2$, where R is a hydrogen atom, or an alkyl radical with 1–6 carbon atoms or a $C_{6-12}$ aryl.

In particular, said polyolefins comprise:
1) isotactic or mainly isotactic polypropylene;
2) HPPE (i.e. ethylene copolymers having usually a density of 0.95 g cm$^3$ or greater), LLDPE (i.e. ethylene homopolymers having usually a density of 0.91 g/cm$^3$ or greater), LDPE (i.e. ethylene homopolymers having usually a density of 0.91 g/cm$^3$ or greater)
3) crystalline copolymers of propylene with ethylene and/or other $C_{3-8}$ straight or branched alpha-olefins such as 1-butene, 1-hexene, 1-octene, 4-methyl-1-pentene;
4) ethylene/$C_{3-8}$ alpha-olefin elastomeric copolymers and ethylene/$C_{3-8}$ straight or branched alpha-olefin/diene terpolymers containing minor portions of diene, where the alpha-olefin is straight or branched and preferably selected among propylene, 1-butene, 1-pentene, 1-hexene, 4-methyl-1-pentene, 3-methyl-1-butene and is present in an amount of 30 to 80 wt. %;
5) heterophasic polymers obtained through sequential polymerization, comprising (A) a propylene homopolymer fraction or one of the copolymers mentioned in item (3), above, and a copolymer fraction (B) of an elastomeric copolymer mentioned in item (4) above (typically the copolymer fraction (B) is present in an amount from 10 to 60 wt. %).

Examples of dienes which are most commonly present in the above mentioned elastomeric copolymers are the butadiene, the ethylidene-norbornene, and the 1-4 hexadiene (typically the diene is present in an amount from 1 to 10 wt. %).

The olefin polymers can be synthesized with any Ziegler-Natta catalyst which can produce polymer particles with a regular, essentially symmetrical, usually spheroidal geometrical shape, such as to guarantee good flowability. The preferred flowability values are between 9 and 16 seconds, measured according to ASTM norm 1895-69 method A.

It is also desirable that the polymer particles have a bulk density between 0.3 and 0.6 g cm$^3$, determined according to ASTM norm 1895-69 method A.

Specific examples of catalysts which can be used for the preparation of polyolefins in particulate form with the above mentioned characteristics, are the nonsupported Ziegler-Natta catalysts obtained from (A) a solid component made up of particles of TiCl$_3$ derived by reducing TiCl$_4$ with organic aluminum compounds, with (B) an aluminum alkyl compound, such as diethylaluminum chloride.

Other examples are the supported Ziegler-Natta catalysts, obtained by the reaction of a solid component comprising a Ti compound with at least one Ti-Cl link, and, optionally, an electron-donor compound supported on MgCl$_2$ in particles of a regular, essentially symmetrical, usually spheroidal geometrical form, with an organic aluminum compound, particularly a trialkyl aluminum compound, optionally combined with an electron-donor compound.

Among the supported catalysts, those containing MgCl$_2$ in active form are preferred, i.e. those which are characterized by an X-ray spectrum where the maximum intensity reflection which appears in the spectrum of a normal magnesium chloride is substituted by a halo with maximum intensity moved over with respect to the maximum intensity reflection, or by the fact that said reflection shows an enlargement.

The catalyst component supported on MgCl$_2$ in particles of the aforementioned regular geometrical form can be obtained through various methods.

For example, it is possible to prepare spherical particles of MgCl$_2$ adducts with electron-donor compounds preferably containing active hydrogen atoms, such as H$_2$O, alcohols, phenols, and treat said spherical particles with the Ti compound, and optionally with an electron-donor compound. Before the reaction with the titanium compound, the electron-donor compound present in the adduct with the magnesium chloride can be at least partially removed from the adduct itself, for example by thermal treatment or by reaction with alkyl aluminum compounds.

Examples of preparation methods of catalyst components of this type are described in U.S. Pat. Nos. 3,953,414 and 4,399,054, the disclosures of which are incorporated therein by reference.

Another example for the preparation of catalyst components supported on MgCl$_2$ in particles of said regular geometrical form, include the reaction of a Ti compound with spheroidal particles comprising an alcoholate or halogenaalcoholate of Mg or their mixtures. Specific methods for the preparation of catalytic components of this type are described in U.S. Pat. No. 4,220,554.

Examples of highly active and stereospecific catalysts, that can be obtained by reaction of the above mentioned catalyst components with an aluminum alkyl compound and an electron-donor compound selected among specific silanes classes, are described in European patent no. 45,977, and in published European patent applications 45,976 and 45,975.

Alternately, the catalyst component containing the Ti compound can be deposited on an inert support of a regular form and organic nature (for example styrene polymers) or inorganic nature (microspheroidal silica, for instance).

Examples of this type of catalysts are shown in published European patent applications 283,011 and 344,755.

Other examples of supported Ziegler-Natta catalysts capable of producing polyolefin particles of said regular geometrical shape are described in published European patent applications 250,230 and 216,402.

The catalysts described above are, among other things, capable of producing polyolefin particles having a controlled particle size (i.e., without extremely fine powders or excessively large particles), and, therefore, they are particularly suited for stabilization with the process of the present invention.

A preferred example of particles which are particularly suited for stabilization with the present process are spherical or spheroidal particles having a diameter from 0.5 to 4.5 mm and a controlled particle size distribution, i.e. with at least 90% of the particles having a diameter between 0.5 and 3.5 mm.

The polyolefins in particle form having said regular geometrical shape are prepared according to known polymerization processes, operating in liquid phase, for instance, in the presence or absence of an inert hydrocarbon solvent, or in gas phase, or even combining liquid and gas phase polymerization stages.

The polymerization temperature is generally between 40° C. and 160° C., and the process is carried out at atmospheric pressure or higher.

The polymers stabilized with the present process, i.e. in form of nonextruded particles having said regular geometrical shape, coated or impregnated at least on the surface with the stabilizers and additional components described above, can be used directly for the transformation into finished products.

Following are examples which are illustrative of the process of this invention, the products produced and the physical properties thereof.

In the following examples two types of spherical polymers were used:

a) spherical polypropylene homopolymer (MIL=1.5) with the following particle size distribution:

$\phi > 3.5$ mm = 1%

$\phi$ = diameter $2 < \phi < 3.5$ mm = 48%

$1 < \phi < 2$ mm = 49%

$0.5 < \phi < 1$ mm = 2% fraction insoluble in boiling n-heptane = 97% by weight
bulk density = 0.49 Kg/l
flowability = 13 sec.

b) propylene/ethylene heterophasic spherical composition containing 14% by weight of ethylene, said composition being formed by polypropylene homopolymer and elastomeric ethylene-propylene copolymer, with the following particle size distribution:

$\phi > 3.5$ mm = 2%

$2 < \phi < 3.5$ mm = 54%

$1 < \phi < 2$ mm = 42%

$0.5 < \phi < 1$ mm = 2% bulk density = 0.50 kg/l
flowability = 14 sec.

EXAMPLE 1

In a 1 liter spherical glass flask were introduced:

| | |
|---|---|
| pentraerythritol tetrakis (3,5-di-tert-butyl-4-hydroxyphenyl) propionate (hereinafter called Stabilizer A) | g 100 |
| SANDOSTAB-P-EPQ | g 50 |
| ROL/OB 55-AT paraffin oil (*) | g 100 |

(*) paraffin oil having a density of 0.885 + 10% kg/l at 15° C. (ASTM D 1298) and flowing point (ASTM D 97) = −10 + 2° C.

The ingredients were heated to 120° C., under agitation and in N₂ atmosphere, until a homogeneous liquid was obtained.

In a 14 liter Henschel mixer were introduced 2 Kg of spherical particles of polypropylene which were heated to 65°–70° C., together with 1 g of glyceryl monostearate.

On the hot polypropylene particles were fed 5 g of the liquid stabilizer mixture and the particles and the liquid were mixed at 1500 rpm for about 5 minutes. 1 g of Ca-stearate was then added to the mixer and the contents were stirred again for 1–2 minutes. The stabilized spherical polypropylene was then discharged. The "pepper-salt" test, carried out in a 150° C. oven on the stabilized spherical polypropylene, showed the first oxidized particles (i.e., yellowing particles) after about 20 hours.

The same spherical polymer, without any stabilization treatment, when submitted to the same test, was completely yellow after 2 hours.

The thermal oxidation test carried out on pressure-injected plaques 2 mm thick obtained from the above mentioned stabilized polymer, showed a resistance of 30 days in a 150° C. oven. The test was considered completed when the first signs of cracking appeared on the sample.

EXAMPLE 2

Using the same method and ingredients of example 1, a stabilizing liquid mixture was prepared which was constituted by:

| | |
|---|---|
| Stabilizer A | g 100 |
| octadecyl-3-(3,5-di-tert-butyl-4-hydrophenyl)-propionate (hereinafter called Stabilizer B) | g 50 |
| SANDOSTAB-PEPQ | g 200 |
| ROL/OB 55 A-T paraffin oil | g 100 |

4.5 g of which were fed on 2 kg of said spherical polypropylene following the same method as in example 1.

After the addition and mixing was complete, 1 g of Ca-stearate was added and mixed. The stabilized spherical polypropylene was then discharged. The following test results were obtained:

"pepper-salt" 150° C. = 16 hours
thermal oxidation 150° = 13 days

EXAMPLE 3

Using the same method and ingredients of example 1 a liquid stabilizing mixture was prepared made up of:

| | |
|---|---|
| Stabilizer A | g 100 |
| Stabilizer B | g 50 |
| SANDOSTAB-PEPQ | g 100 |

2.5 g of which were fed on 2 kg of said spherical polypropylene in the same way as described in example 1.

After the addition of 1 g of Na-stearate the stabilized spherical polypropylene was discharged. The following test results were obtained:

"pepper-salt" 150° C. = 14 hours
thermal oxidation 150° C. = 12 days

EXAMPLE 4

Using the same method and ingredients of example a liquid stabilizing mixture was prepared made up of:

| | |
|---|---|
| Stabilizer A | g 100 |
| SANDOSTAB-PEPQ | g 100 |
| epoxidized linseed oil | g 100 |

3 g of which were fed on 2 Kg of said spherical polypropylene in the same way as described in example 1.

The stabilized spherical polypropylene was discharged and the following test results were obtained:

"pepper-salt" 150° C. = 12 hours
thermal oxidation 150° = 14 days.

EXAMPLE 5

Using the sam method and ingredients of example 1 a liquid stabilizing mixture was prepared made up of:

| | |
|---|---|
| Stabilizer A | g 100 |
| SANDOSTAB-PEPQ | g 50 |
| DSTDP = distearyl thiodipropionate | g 100 |

7 g of which were fed on 2 Kg of said spherical polypropylene in the same way as described in example 1.

After the addition of 1 g of Ca-stearate, the stabilized spherical polypropylene was discharged and the following test results were obtained:

"pepper-salt" 150° C. = 8 hours
thermal oxidation 150° = 50 days.

EXAMPLE 6

Using the same method and ingredients of example 1 a liquid stabilizing mixture was prepared made up of:

| | |
|---|---|
| Stabilizer A | g 100 |
| Stabilizer B | g 50 |
| SANDOSTAB-P-EPQ | g 100 |
| Carlo Erba paraffin wax MP = 70° C. | g 100 |

(MP — melting point)

7 g of which were fed on 2 Kg of said spherical polypropylene in the same way as described in example 1.

After the addition of 1 g of synthetic hydrotalcite (SHT), the stabilized spherical polypropylene was discharged and following test results were obtained:

"pepper-salt" 150° C. = 24 hours
thermal oxidation 150° = 35 days.

EXAMPLE 7

With the same method described in example 1 a liquid stabilizing mixture was prepared made up of:

| | |
|---|---|
| Stabilizer A | g 100 |
| Stabilizer B | g 50 |
| SANDOSTAB-P-EPQ | g 100 |
| microcrystalline paraffin wax | g 100 |

MP = 77° C.

3.5 g of which were fed on 2 Kg of spherical polypropylene in the same way as described in example 1.

After the addition of 1 g of Ca-stearate, the stabilized spherical polypropylene was discharged and the following test results were obtained:

"pepper-salt" 150° C. = 18 hours
thermal oxidation 150° = 12 days.

EXAMPLE 8

Using the same method and ingredients of example 1 a liquid stabilizing mixture was prepared made up of:

| | |
|---|---|
| Stabilizer A | g 50 |
| SANDOSTAB-P-EPQ | g 50 |
| Stabilizer of formula XII | g 450 |

11 g of which were fed on 2 Kg of spherical heterophasic propylene-ethylene composition following the same procedure described in example 1.

Then 10.3 g gray pigment (containing TiO$_2$ and carbon black) and 1 g of Ca-stearate were added to the mixer, mixing for 2 more minutes at 1500 rpm.

Plaques (3 mm thick) of the stabilized heterophasic spherical composition were obtained, through pressure injection at 230° C., and submitted to accelerated U.V. resistance tests by using a XENOTEST 1200 under the following conditions:

| | |
|---|---|
| black panel temperature | 63° C. |
| relative humidity | 60% |
| machine room temperature = about | 43° C. |
| dry/wet cycle | 102/18 min |
| light/light cycle | (continuous irradiation) |

The evaluation of the surface deterioration of the sample was done in terms of color variation (whitening) by increasing the L colorimetric coordinate (correct luminosity) determined with a GARDNER HUNTER-LAB tristimulus colorimeter model 25-9.

The sample stabilized with the liquid mixture described above showed an L of two units after being exposed for 1200 hours, A sample stabilized with the same formulation omitting the stabilizer of formula XII showed an L of 5 units after only 350 hours.

EXAMPLE 9

Using the same method and ingredients of example 1 a liquid stabilizing mixture was prepared made up of:

| | |
|---|---|
| Stabilizer A | g 50 |
| Stabilizer B | g 25 |
| SANDOSTAB-P-EPQ | g 50 |
| Stabilizer of formula XI | g 450 |
| microcrystalline paraffin | g 100 | wax MP = 77° C.

13.5 g of which were fed on 2 Kg of spherical heterophasic propylene-ethylene composition in the same way as in example 1.

In the mixer were then added 10.3 of gray pigment and 1 g of Ca-stearate, mixing for 2 more minutes at 1500 rpm.

From the stabilized heterophasic spherical composition were prepared 3 mm thick plaques, by pressure injection at 230° C., which were submitted to accelerated UV resistance tests in the same apparatus and same operating conditions described in example 8.

The samples showed an increment in L values equal to 1.8 units after an exposure of 1200 hours.

EXAMPLE 10

In an 8 liter stainless steel autoclave, equipped with a mechanical agitator heating jacket fed with steam at 120° C., and an inert gas blanket, are introduced, in order and at intervals of about 15 minutes:

| | |
|---|---|
| ROL OB/55-AT paraffin oil | Kg 1 |
| Stabilizer B | Kg 0.5 |
| SANDOSTAB-P-EPQ | Kg 2 |
| Stabilizer A | Kg 1 | maintaining the agitation for at least 1 hour after the introduction of the last component.

In a 130 liter discontinuous Lodige horizontal mixer, were introduced 30 Kg of spherical polypropylene and 15 g of glyceryl monostearate heated, under agitation, to 70° C. by introducing steam in the heating jacket.

With continuous agitation agitation, 67.5 g of the liquid stabilizing mixture taken from the autoclave were added, and agitation was continued for about 5 minutes at about 79 rpm.

15 g of Ca-stearate were then added to the mixer, the contents were blended for further 1-2 minutes and then discharged.

The stabilized product showed the following test results:

"pepper-salt" 150° C.=18 hours
thermal oxidation 150° C.=14 days.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for the stabilization of olefin polymers in the form of nonextruded, as polymerized particles having a regular, essentially symmetrical geometrical shape, said particles being formed in said regular shape directly during polymerization reaction, said process comprising depositing on the surface of said particles a molten mixture or a mixture in which at least the stabilizer (A) is in the liquid state, said mixture comprising the following stabilizers (percent by weight of the polymer):

A) from 0.02% to 0.15% of one or more organic phosphites or phosphonites or mixtures thereof which are liquid at room temperature or have a melting point below 100° C.;

B) from 0.25% to 0.2% of one or more phenolic antioxidants with melting points from 45° to 130° C.;

and, optionally, one or more of the following additional components:

C) from 0.05% to 0.5% of one or more thioethers or organic polysulfides or mixtures thereof;

D) from 0.1% to 1.0% of one or more light stabilizers which are liquid at room temperature or have a melting point below 150° C., selected from the group consisting of hindered amine light stabilizers, benzophenone and benzotriazole derivatives;

E) one or more diluents selected from the group consisting of paraffins and cycloparaffins which are liquid at room temperature or have a melting point below 110° C., epoxidized soy bean or linseed oil, silicone oils and olefin oligomers in an amount not greater than 0.3%.

2. The process of claim 1, wherein the olefin polymers are selected from the group consisting of:
1) isotactic or mainly isotactic polypropylene;
2) HDPE, LLDPE, LDPE polyethylene
3) crystalline copolymers of propylene with ethylene and/or other $C_{3-8}$ straight or branched alpha-olefins;
4) elastomeric ethylene/$C_{3-8}$ alpha-olefin copolymers and elastomeric ethylene/$C_{3-8}$ alpha-olefin/diene terpolymers containing minor proportions of diene, where the alpha-olefin is selected from the group consisting of propylene, 1-butene, 1-pentene, 1-hexene, 4-methyl-1-pentene, or 3-methyl-1-butene;
5) heterophasic polymers comprising (A) a homopolymer fraction of the propylene or one of the copolymers defined in item (3) and a copolymer fraction (B) of the elastomeric copolymers defined in item (4).

3. The process of claim 1, wherein the stabilizers (A) are selected from the group consisting of distearylpentaerythrityl diphosphite; 4,4'-butylidene-bis (3-methyl-6-tert-butylphenyl-di-tridecyl) phosphite; tri(monononylphenyl) phosphite, and compounds having the following formulas:

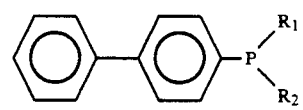

where $R_1$ and $R_2$ are both $-O-C_4H_9$, $-O-C_8H_{17}(iso)$ or

radicals, or either $R_1$ or $R_2$ is a

radical, while the other is a $-O-C_4H_9$ or $-O-C_8H_{17}(iso)$ radical;

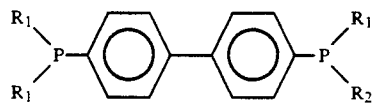

where $R_1$ and $R_2$ are both $-O-C_4H_9$, $-O-C_8H_{17}(iso)$,

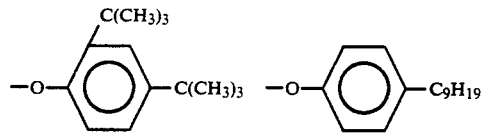

radicals or
$R_1$ is a

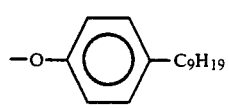

radical and $R_2$ is a $-O-C_8H_{17}$, $-O-C_8H_{17}(iso)$, or $-O-C_4H_9$ radical, or $R_1$ is a

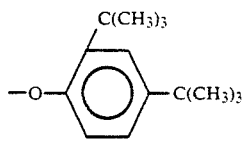

radical and R₂ is a —O—C₄H₉ radical;

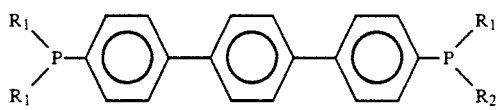

where R₁ and R₂ are both —O—C₈H₁₇ or

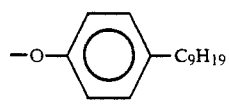

radicals, or R₁ is a

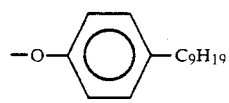

radical and R₂ is a

radical.

4. The process of claim 1, wherein the stabilizers (B) are selected from the group consisting of 2,6-di-tert-butyl-4-methylphenol, 2,2-bis(4-(2-(3,5-di-tert-butyl-4-hydroxyhydrocinnamoyloxy))ethoxyphenyl) propane, and octadecyl 3-(3,5-di-tert-butyl-4-hydroxyphenyl)propionate.

5. The process of claim 1, wherein components (C) are selected from the group consisting of dilauryl thiodipropionate; distearyl thiodipropionate and compounds having the general formula (IX) R—S—S—R, where the R radicals, the same or different, are alkyl, aryl or aralkyl radicals with 1 to 20 carbon atoms.

6. The process of claim 1, wherein the light stabilizers (D) are selected from the group consisting of compounds having the formulas:

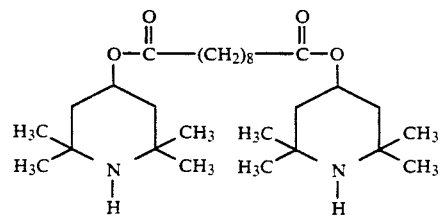

XI

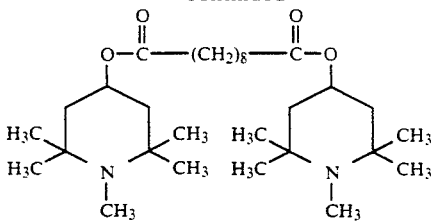

XII

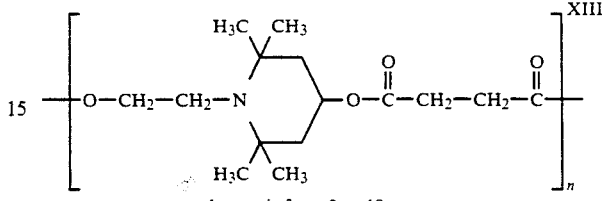

XIII where n is from 2 to 10,

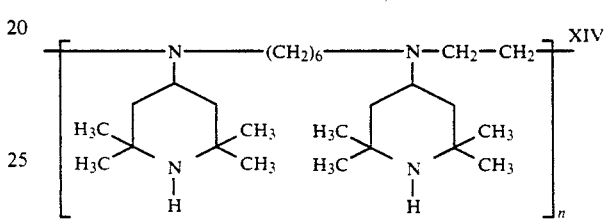

XIV

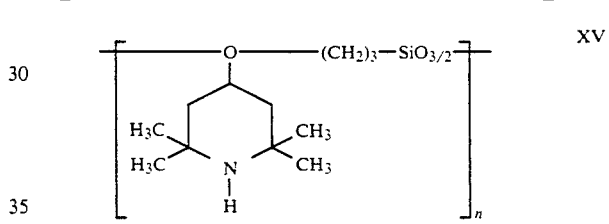

XV where n is from 2 to 100, 2-hydroxy-4-n-octyloxy benzophenone and 2-(2'hydroxy-3'-tert-butyl-5'-methylphenyl)-5-chlorobenzotriazole.

7. The process of claim 1, wherein as diluent (E) are used microcrystalline paraffin waxes having a melting point from 60° C. to 90° C.

8. The process of claim 1, wherein the liquid mixture comprises the following stabilizers:
  A) tetrakis(2,4-di-tert-butylphenyl)4,4'-biphenylene diphosphonite;
  B) pentaerythritol tetrakis(3-(3,5-di-tert-butyl-4-hydroxyphenyl)propionate) and optionally, octadecyl 3-(3,5-di-tert-butyl-4-hydroxyphenyl)propionate,
and optionally,
  D) the hindered amine light stabilizer of formula XII, and
  E) one or more diluents.

9. The process of claim 1, wherein the liquid mixture is deposited on the polymer particles having a temperature now lower than 50° C.

10. Stabilized olefin polymers in the form of nonextruded, as polymerized particles having a regular, essentially symmetrical geometrical shape, coated or impregnated at least on the surface with a mixture comprising:
  A) from 0.02% to 0.15% of one or more organic phosphites or phosphonites or mixtures thereof, which are liquid at room temperature or have melting point below 100° C.;
  B) from 0.25% to 0.2% of one or more phenolic antioxidants with melting point from 45° to 130° C.;

and, optionally, one or more of the following additional components:

C) from 0.05% to 0.5% of one or more thioethers or organic polysulfides or mixtures thereof;

D) from 0.1% to 1.0% of one or more light stabilizers which are liquid at room temperature or have a melting point below 150° C., selected from the group consisting of hindered amine light stabilizers, benzophenone and benzotriazole derivatives;

E) one or more diluents selected from the group consisting of paraffins and cycloparaffins which are liquid at room temperature or have a melting point below 110° C., epoxidized soy bean or linseed oil, silicone oils, and olefin oligomers in amount not greater than 0.3%.

11. The stabilized olefin polymers of claim 10 coated or impregnated at least on the surface with a liquid mixture comprising:

A) tetrakis(2,4-di-tert-butylphenyl)4,4'-biphenylene diphosphonite;

B) pentaerythritol tetrakis(3-(3,5-di-tert-butyl-4-hydroxyphenyl)propionate and, optionally, octadecyl 3(3,5-di-tert-butyl-4-hydroxyphenyl)propionate, and, optionally, D) the hindered amine light stabilizer of formula XII;

E) one or more diluents.

12. The stabilized olefin polymers of claim 10 having flowability values from 9 to 16 second and bulk density from 0.3 to 0.6 g/cm$^3$.

13. The stabilized olefin polymers of claim 10, in spherical particle form having a diameter from 0.5 to 4.5 mm, and for at least 90% a diameter between 0 5 and 3.5 mm.

* * * * *

UNITED STATES PATENT AND TRADEMARK OFFICE
CERTIFICATE OF CORRECTION

PATENT NO. : 5,158,992

DATED : October 27, 1992

INVENTOR(S) : Giancarlo Caselli et al.

It is certified that error appears in the above-identified patent and that said Letters Patent is hereby corrected as shown below:

At col. 4, line 37, change "radicals" to --radical--.

At col. 4, line 67, change "$R_{23}$" to --$R_2$--.

At col. 6, line 32, change "$C-C_{18}$" to --$C_1-C_{18}$--.

At col. 7, line 60, change "pentaerthritol-tetrakis(3,5-di-tert-butyl-4-hydroxyphenyl)propionate" to --pentaerthritol-tetrakis(3-(3,5-di-tert-butyl-4-hydroxyphenyl)propionate)--.

Signed and Sealed this

Eighth Day of March, 1994

Attest:

BRUCE LEHMAN

Attesting Officer

Commissioner of Patents and Trademarks